United States Patent [19]
Parthasarathy

[11] Patent Number: 5,742,705
[45] Date of Patent: Apr. 21, 1998

[54] METHOD AND APPARATUS FOR CHARACTER RECOGNITION OF HANDWRITTEN INPUT

[76] Inventor: Kannan Parthasarathy, 3316 St. Michael Dr., Palo Alto, Calif. 94306

[21] Appl. No.: 919,875

[22] Filed: Aug. 28, 1997

Related U.S. Application Data

[63] Continuation of Ser. No. 465,502, Jun. 5, 1995, abandoned.
[51] Int. Cl.$^6$ ........................................................ G06K 9/18
[52] U.S. Cl. ............................................ 382/185; 382/187
[58] Field of Search ..................................... 382/185, 186, 382/187, 188, 189, 209, 218; 178/18, 19, 70

[56] References Cited

U.S. PATENT DOCUMENTS

| | | | |
|---|---|---|---|
| 3,665,450 | 5/1972 | Leban | 340/324 A |
| 3,820,644 | 6/1974 | Yeh | 197/1 A |
| 3,852,720 | 12/1974 | Park | 340/172.5 |
| 4,096,934 | 6/1978 | Kirmser et al. | 400/110 |

(List continued on next page.)

FOREIGN PATENT DOCUMENTS

| | | |
|---|---|---|
| 0087871A1 | 2/1983 | European Pat. Off. . |
| 0114248A2 | 11/1983 | European Pat. Off. . |
| 52-81578 | 7/1979 | Japan . |
| 54-31433 | 9/1980 | Japan . |
| 54-61146 | 12/1980 | Japan . |
| 54-106446 | 3/1981 | Japan . |
| 56-106755 | 3/1981 | Japan . |
| 54-119240 | 4/1981 | Japan . |
| 54-120380 | 4/1981 | Japan . |
| 54-159997 | 7/1981 | Japan . |
| 55-187975 | 7/1982 | Japan . |
| 56-97586 | 12/1982 | Japan . |
| 57-52664 | 5/1983 | Japan . |
| 57-1721 | 7/1983 | Japan . |
| 57-5367 | 7/1983 | Japan . |
| 57-97453 | 12/1983 | Japan . |
| 58-166766 | 5/1985 | Japan . |
| 58-191016 | 5/1985 | Japan . |

OTHER PUBLICATIONS

Yoshida, Makoto et al., "Handwritten Chinese Character Recognition by an Analysis–By–Synthesis Method", *Proceeding of 1st Int. Joint Conf. on Pattern Recognition*, Oct. 30–Nov. 1, 1973, pp. 197–204.

Ikeda, Katsuo et al., "On–Line Recognition of Hand–written Characters Utilizing Positional and Stroke Vector Sequences", *Pattern Recognition*, vol. 13, No. 3, 1981, pp. 191–206.

Arakawa, Hiroki et al., "On–Line Recognition of Handwritten Characters", *Review of the Electrical Communication Laboratories*, vol. 26, Nos. 11–12, Nov.–Dec. 1978, pp. 1521–1536.

"Attributed String Matching by Split–and–Merge for On–Line Chinese Character Recognition", Yih–Tay Tsay and Wen–Hsiang Tsai, IEEE Transactions on Pattern Analysis and Machine Intelligence, vol. 15, No. 2, Feb. 1993, pp. 180–185.

*Primary Examiner*—Joseph Mancuso
*Attorney, Agent, or Firm*—J. Ray Wood

[57] ABSTRACT

A method and apparatus for recognition of handwritten input is disclosed where handwritten input composed of a sequence of (x, y, pen) points, is preprocessed into a sequence of strokes. A short list of candidate characters that are likely matches for the handwritten input is determined by finding a fast matching distance between the input sequence of strokes and a sequence of strokes representing each candidate character of a large character set where the sequence of strokes for each candidate character is derived from statistical analysis of empirical data. A the final sorted list of candidate characters which are likely matches for the handwritten input is determined by finding a detailed matching distance between the input sequence of strokes and the sequence of strokes for each candidate character of the short list. A final selectable list of candidate characters is presented to a user.

36 Claims, 8 Drawing Sheets

U.S. PATENT DOCUMENTS

| | | | |
|---|---|---|---|
| 4,112,415 | 9/1978 | Hilbrink | 382/13 |
| 4,144,405 | 3/1979 | Wakamatsu | 178/30 |
| 4,173,753 | 11/1979 | Chou | 382/13 |
| 4,193,119 | 3/1980 | Arase et al. | 364/900 |
| 4,228,507 | 10/1980 | Leban | 364/419 |
| 4,251,871 | 2/1981 | Yu | 178/30 |
| 4,270,022 | 5/1981 | Loh | 178/30 |
| 4,284,975 | 8/1981 | Odaka | 382/13 |
| 4,317,109 | 2/1982 | Odaka et al. | 382/13 |
| 4,327,421 | 4/1982 | Wang | 400/110 |
| 4,365,235 | 12/1982 | Greanias et al. | 382/13 |
| 4,379,288 | 4/1983 | Leung et al. | 340/365 R |
| 4,440,513 | 4/1984 | Kataoka et al. | 382/13 |
| 4,462,703 | 7/1984 | Lee | 400/110 |
| 4,500,872 | 2/1985 | Huang | 340/365 R |
| 4,516,262 | 5/1985 | Sakurai | 382/18 |
| 4,531,231 | 7/1985 | Crane et al. | 382/13 |
| 4,561,105 | 12/1985 | Crane et al. | 382/13 |
| 4,573,196 | 2/1986 | Crane et al. | 382/13 |
| 4,607,386 | 8/1986 | Morita et al. | 382/13 |
| 4,653,107 | 3/1987 | Shojima et al. | 382/13 |
| 4,672,677 | 6/1987 | Yamakawa | 382/13 |
| 4,682,365 | 7/1987 | Orita et al. | 382/14 |
| 4,684,926 | 8/1987 | Yong-Min | 382/56 |
| 4,685,142 | 8/1987 | Ooi et al. | 382/13 |
| 4,718,102 | 1/1988 | Crane et al. | 382/13 |
| 4,829,583 | 5/1989 | Monroe et al. | 382/13 |
| 4,972,496 | 11/1990 | Sklarew | 382/17 |
| 5,058,182 | 10/1991 | Kuan et al. | 382/25 |
| 5,191,622 | 3/1993 | Shojima et al. | 382/185 |
| 5,315,667 | 5/1994 | Fujisaki et al. | 382/13 |

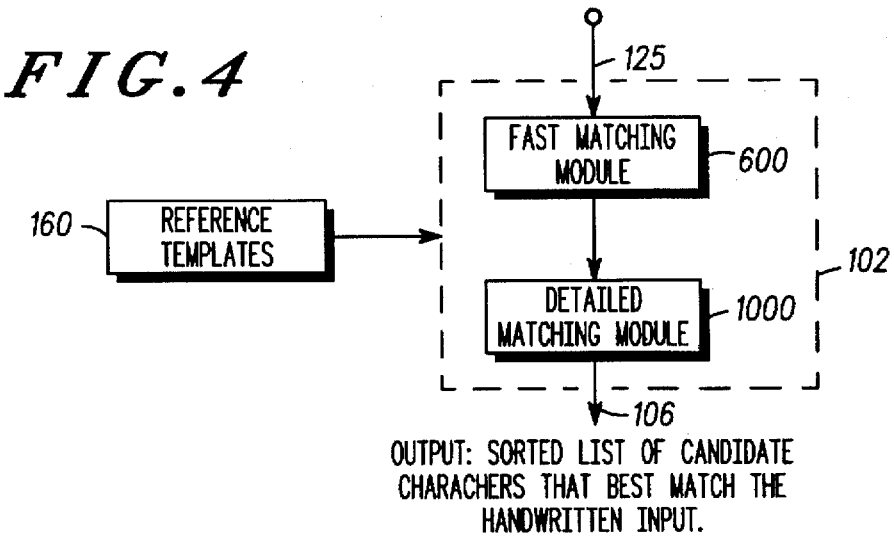
FIG.4
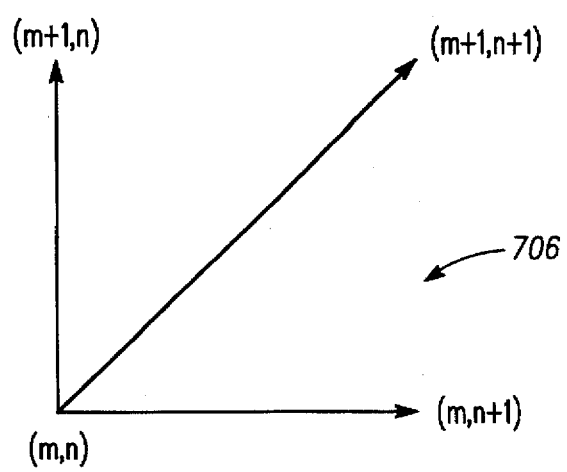
FIG.5
FIG.7
702
S1 = [10, 25, 15, 90, 120]
S2 = [15, 5, 100, 140]
704

1

METHOD AND APPARATUS FOR CHARACTER RECOGNITION OF HANDWRITTEN INPUT

This is continuation of application Ser. No. 08/456,502, filed Jun. 5, 1995 and now abandoned.

FIELD OF THE INVENTION

This invention relates generally to handwriting recognition, and more particularly to recognition of large characters sets where each character includes one or more strokes.

BACKGROUND OF THE INVENTION

Machine recognition of human handwriting is a very difficult problem, and with the recent explosion of pen-based computing and electronic devices, has become an important problem to be addressed. There exists various different computing and electronic devices that accept handwritten input. So called pen-based products, for example, computers, and personal digital assistants, and the like typically have a touch sensitive screen upon which a user can impose handwriting. These devices then function to digitize the handwritten input Other devices, such as computers, advanced telephones, digital televisions, and other information processing devices, can access a digitizing tablet which can accept handwritten input. Still other devices can receive handwritten character input by means of a fax, scanned input, electronic mail, or other electronic transmission of data. These devices process the information and attempt to recognize the information content of the handwritten input; Typically, the device then displays that information to the user for purposes of feedback, correction of errors in the processing, and for recognition of the handwritten character input.

There exists various approaches for recognition of handwritten input when the recognition is for characters sets having a limited finite number of characters, typically under a hundred. However often such approaches do not work as well for character sets having large numbers of varied complex characters. Examples of large character sets that have been difficult to quickly and accurately recognize through recognition of handwritten input are several of the asian ideograghic character/symbol languages, such as Chinese, simplified and traditional, Japanese, and other languages having large character sets, Some languages such as simplified Chinese consist of several thousand characters.

Traditional methods, such as keyboard entry, of inputing data and text supplied in one of these types of large character based languages is often very difficult; inpart because of the large number and complexity of the character set. Additionally, many of these such languages resort to phonetic based representations using Western characters in order to enter the characters with a keyboard. Hence, keyboard-type entry of such characters is difficult. An example of the difficulty of keyboard entry for a large character set based language is keyboard entry of the Chinese language. To enter data, or text, in Chinese, via a keyboard, the language is first Romanized. Western Characters, such as the English, anglo-saxon alphabet are used to phonetically represent the characters of the Chinese language. This is referred to as Pin-yin. Therefore, for a person wishing to enter data or text in Chinese through a keyboard, the person must first know Pin-yin, and the corresponding English character representation for the phoentic equivalent of the chinese character they are trying to enter via the keyboard.

Another, difficulty encountered with recognition of handwritten input of data, or text, based upon a langague having a large character set is diversity among various persons is great because of the large amount of characters and the complexity of the characters themselves. Additionally, many of these such languages have one or more forms of representing the same character, similar to print and cursive forms for the English, anglo-saxon alphabet. Additionally, such languages may have homophones for example, the Chinese language has numerous homophones—words that are pronounced the same but have different meaning and written forms. Hence, the same Pin-yin can refer to a multiplicity of characters and the person entering Chinese character data must often select from a list of possible choices.

Typically, techniques used for handwriting recognition of the english, anglo-saxon alphabet character set, or other such limited finite character sets of under hundred, do not produce accurate results for languages having large character sets, of several hundred or several thousand varied complex characters. Many of the techniques used for handwriting recognition of small character set languages are very slow when used for large character set languages.

Therefore, because of the increasing use of pen-based electronic input devices, the difficulty of keyboard entry for large, complex, character set languages, a need exists for a method and apparatus for recognition of handwritten input for complex, large character set langauages that is quick, accurate, and easy to use.

BRIEF DESCRIPTION OF THE DRAWINGS

FIG. 4, Illustrates a block diagram of operation of a preferred embodiment of character matching in accordance with the present invention, FIG. 5 Illustrates a block diagram of operation of a preferred embodiment of fast matching in accordance the present invention.

FIG. 7 Illustrates graphically a preferred embodiment of fast matching in accordance with the present invention.

DETAILED DESCRIPTION OF PREFERRED EMBODIMENT

Generally, the present invention relates to a method and apparatus for recognition of handwritten input; and preferably the present invention relates to a method and apparatus for recognition of handwritten input representing one or more characters selected from a language or compilation of data having a large complex set of characters where each character includes one or more strokes.

Pursuant to a preferred embodiment of the present invention, candidate characters in support of a handwriting recognition method and apparatus of the present invention are developed through the compilation and statistical analysis of empirical data compiled from hundreds of samples of actual handwritten characters. Candidate characters produced through the development of templates derivved from the compilation and statistical analysis of the empirical data are selectable as the recognized character of the handwritten input.

Figure 1:
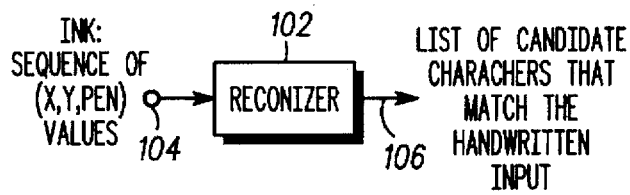
FIG. 1 Illustrates a block diagram of operation of a preferred embodiment of the presention invention.
Figure 1A:
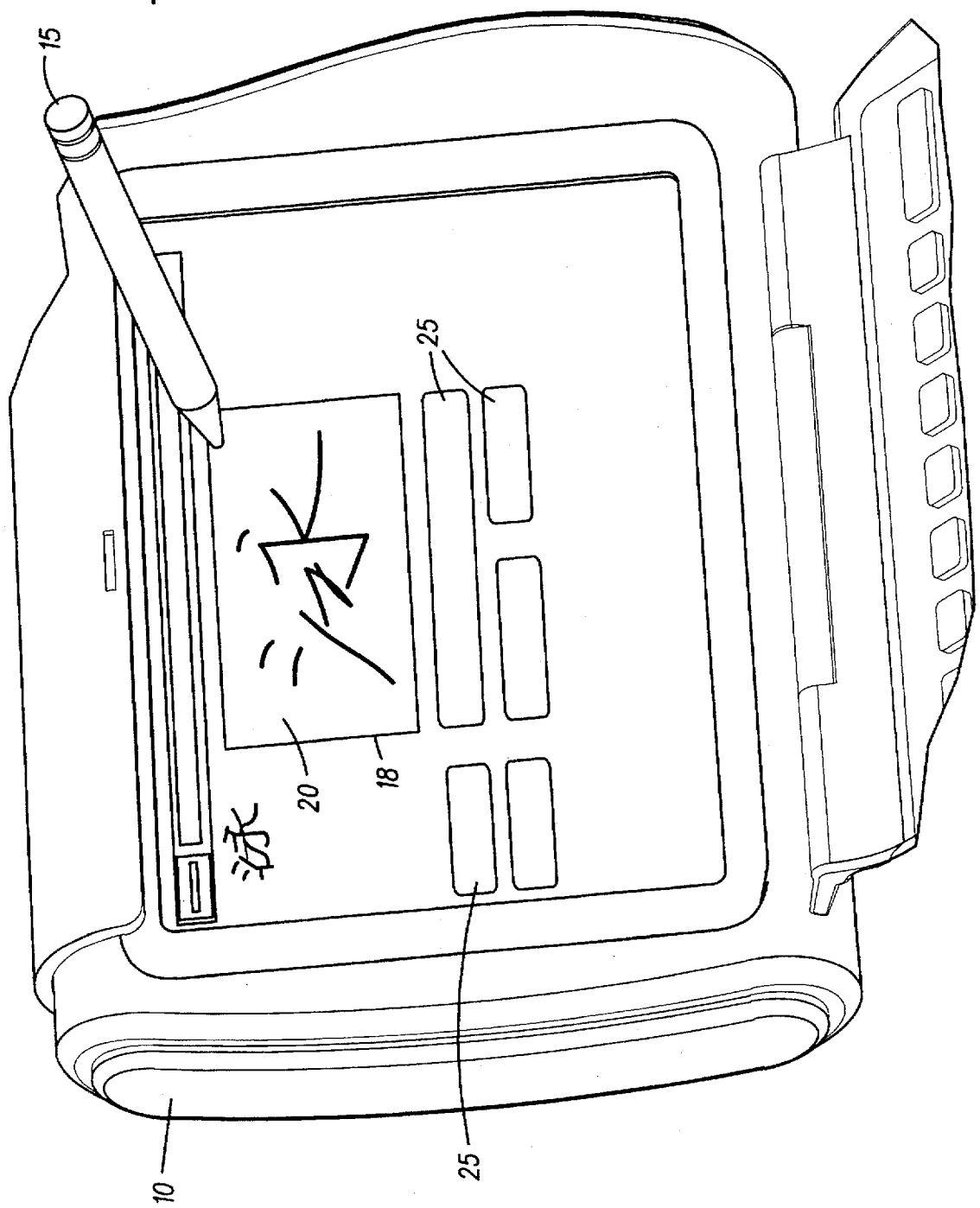
FIG. 1a Illustrates a front, left perspective view of an illustrative pen-based microprocessor entry device suitable to receive input in accordance with the present invention.
Figure 12:
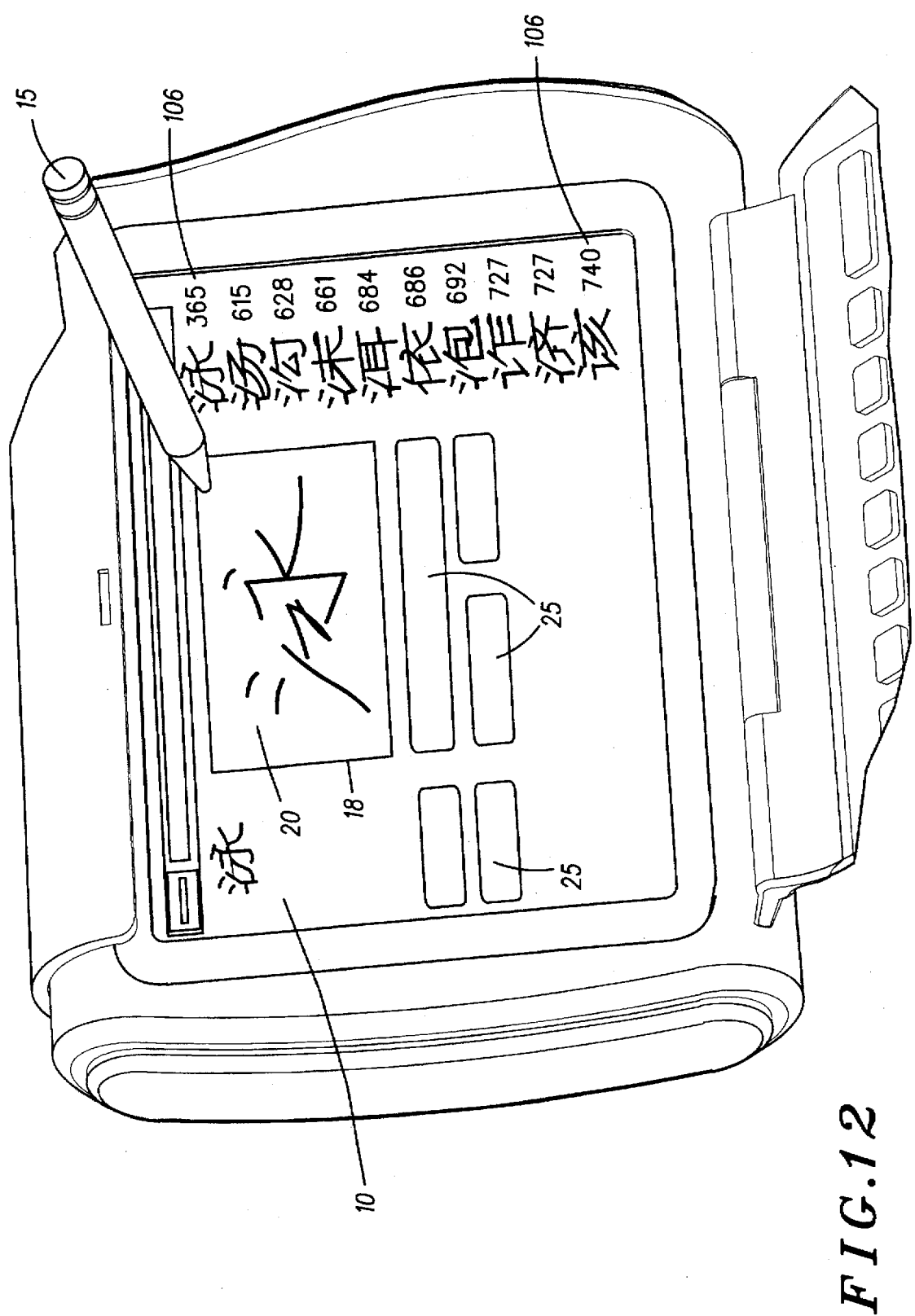
FIG. 12. Illustrates a front, left perspective view of an illustrative pen-based electronic entry device having a microprocessor upon which handwritten input has been received and a corresponding detailed matching has been displayed in accordance with a preferred embodiment of the present invention.

Referring now to the Figures, FIGS. 1, 1a and 12 illustrate general operation of a method and apparatus in accordance with a preferred embodiment of the present invention. With reference to FIG. 1a, and 12 an example of a pen-based electronic entry device is illustrated. A personal digital assistant is illustrated as generally depicted by the reference numeral 10. The personal digital assistant (10) depicted constitutes a generic representation, typically such devices include a housing (12) and a touch screen (18) upon which input can be handwritten using an appropriate hand manipulated stylus (15). Such devices typically include one or more microprocessors or other digital processing devices. As such, these devices comprise computational platforms that can be readily adapted in accordance with the teachings presented herein. It should be understood that, while such personal digital assistants comprise a ready platform to accommodate the practice of the applicant's teachings, the teachings presented herein may be practiced in a variety of other operating environments as well. Some examples of such environments include, but are not limited to the following, computers or other electronic entry devices with digitizing screens, or connected to a digitizing input surface, or capable of receiving faxed, scanned, or other electronic input, digital or interactive televisions, modems, telephones, pagers, or other systems with the ability to capture handwritten input and process it.

Referring now to FIG. 1 a block diagram of a preferred embodiment of recognizing handwritten input in accordance with the present invention is illustrated. Handwritten input in accordance with a preferred embodiment of the present invention is represented as a sequence of (x,y,pen) values where x and y represent the (x,y) coordinates of an ink point with respect to some coordinate system and pen is a binary variable that represents the pen state with respect to the input surface of a device. A pen value can either be a pen-up (pen is not in contact with the writing or input surface) or a pen-down (pen is in contact with the writing or input surface). In accordance with the present invention, handwritten input may be captured electronically using a digitizing tablet, or alternatively may be derived from a scanned or faxed image through a process of line detection in the image. Such methods of capturing handwritten input electronically are understood in the art. In a preferred method, handwritten input is accepted by a device, such as a personal digital assistant (PDA) or other device. Other devices that function to receive handwritten input include, but are not limited to, the following: computers, modems, pagers, telephones, digital televisions, interactive televisions, devices having a digitizing tablet, facsimile devices, scanning devices, and other devices with the ability to capture handwritten input.

In the present invention, the handwritten input (ink) that is presented to the recognizer corresponds to that of a single character. If two or more characters need to be recognized, then the ink corresponding to each character must be supplied to the recognizer separately in time and preferably in the desired sequential order in order to determine the identity of and preferred order of each of the characters.

In accordance with the present invention and illustrated in FIGS. 1, and 1a, and 12, generally the recognizer (102) performs a series of operations on the input ink (104) and produces a list of candidate characters (106) that correspond to and represent the handwritten input (20). Preferably a list of candadate characters (106) is provided from which selection is made of the candidate character that most likely corresponds to and represents the handwritten input. The list may be variable in the number of candidate characters presented to choose from. The candidate character that most represents and corresponds to the handwritten input can then be selected. The selection can occur through various methods, including but not limited to such methods as user selection, or language modeling, or the like. In accordance with a preferred embodiment of the present invention the recognizer of the present invention is adapted and configured to recognize individual characters which are a part, or subset, of large character sets where preferably each character includes one or more strokes and the character set comprises hundreds or even thousands of individual characters, and more preferably whose individual characters have a preponderance of straight line pieces. Examples of such large character sets include but are not limited to the ideographic character symbols of several of the asian languages, including but not limited to Chinese, Japanese, etc. In accordance with a preferred method and embodiment of the present invention, recognition of handwritten input in accordance with the present invention is accomplished with respect to the character set of the simplified Chinese language, in particular, of the characters defining the category of GB1 simplified Chinese characters.

Figure 2:
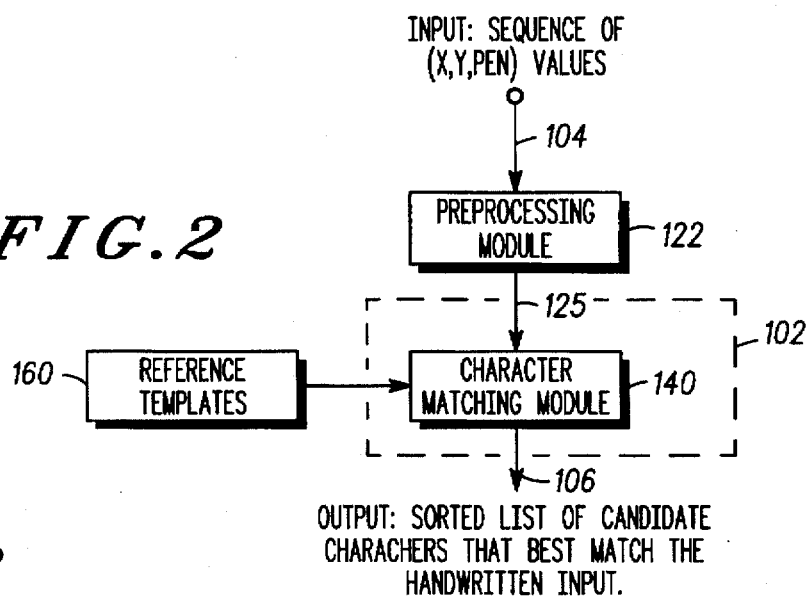
FIG. 2 Illustrates a block diagram detailing operation of a preferred embodiment of the present invention.

Referring now to FIG. 2, a block diagram detailing operation of a preferred method and apparatus is illustrated. As shown in FIG. 2, a preferred embodiment of the present invention includes access to a preprocessing module (122), a character matching module (140), and a set of reference templates (160). Preferably, the preprocessing module converts the handwritten input(20), or raw input data, i.e. sequence of (x,y,pen) (104) values into a sequence of "strokes." In accordance with the present invention a "stroke" is defined as a basic unit of pen movement. Any handwritten input can then be represented as a sequence of strokes. A preferred representation for a "stroke" is a straight line parametrized is by using a four dimensional vector having the following dimensions: 1) tax, 2) my, 3) len, 4) ang. Where mx is the x coordinate of the mid point of the stroke, my is the y coordinate of the mid point of the stroke, len is the length of the straight line stroke, and ang is the angle made by the straight line stroke with respect to some reference axis (like the x axis). Alternatively, other definitions of "stroke" and other parametrizations of straight line "stroke" may used in accordance with the preprocessing module (122) of the present invention. The preprocessing module (122) reduces the amount of data that needs to processed by the recognizer (102) and it also serves to correlate multiple instances of the same handwritten character that look similar, and provides the recognizer (102) with a preferred quality of input. An embodiment of the preprocessing module is described in related U.S. patent application entitled METHOD AND MICROPROCESSOR FOR PREPROCESSING HANDWRITING HAVING CHARACTERS COMPOSED OF A PREPONDERANCE OF STRAIGHT LINE SEGEMENTS filed concurrently, and on the same day as the present application, having U.S. Ser. No. 08/463,366.

In the preferred method and embodiment of the present invention, the recognizer includes the character matching module (140). Generally, the character matching module (140) correlates and compares the handwritten input of the present invention to one or more sets of stored reference templates (160) and then provides a corresponding list of preferred candidate characters that have the most probablity of representing the original handwritten input(20).

Generally, the reference templates (160) of the present invention include one or more templates or sets of templates for each character in the large character set. For a preferred embodiment of the present invention the recognizer (102) was implented for Simplified Chinese Characters (the character set used in Mainland China) and has a vocabulary size of 3755 characters. This character set is commonly referred to as GB1, where simplified Chinese Characters consist of character sets GB1 and GB2. In the preferred embodiment of the present invention several templates are referred to, or accessed, by the recognizer (102) for each character in the preferred GB1 Character set vocabulary. The multiple templates for each character are provided to balance diversity among writer to writer variations of the complex characters; and balance diversity of forms, i.e. print vs cursive, of representing the same character even among the same writer. Pursuant to a preferred embodiment of the present invention the reference templates (160) of candidate characters are developed from empirical data The empirical data is compiled and statistical analysis is performed on hundreds of samples of actual handwritten input representing each of the potential characters to be recognized. These candidate characters are then provided in accordance with the present invention and are selectable as the corresponding and representative recognized character of the handwritten input.

A preferred format of the reference templates (160) is similar to that of the preprocessed ink that is produced by the preprocessing module (122). Accordingly, each "stroke" is parametrized in some fashion. In accordance with the present invention a "stroke" is simply a straight line parameterized is some fashion. As discussed previously a preferred way of parameterizing a "stroke" is by using a four dimensional vector having the following dimensions: 1) mx, 2) my, 3) len, 4) ang. Where mx is the x coordinate of the mid point of the stroke, my is the y coordinate of the mid point of the stroke, len is the length of the "stroke"and ang is the angle made by the "stroke" with respect to some reference axis (like the x axis). Referring to the preferred reference templates accessed by the present invention, each "stroke"in addition to being parametrized in some fashion, has a weight associated with it which indicates how important the stroke is to describe the character; the weight associated with each stroke is determined from analysis of the empirical data.

Figure 3:
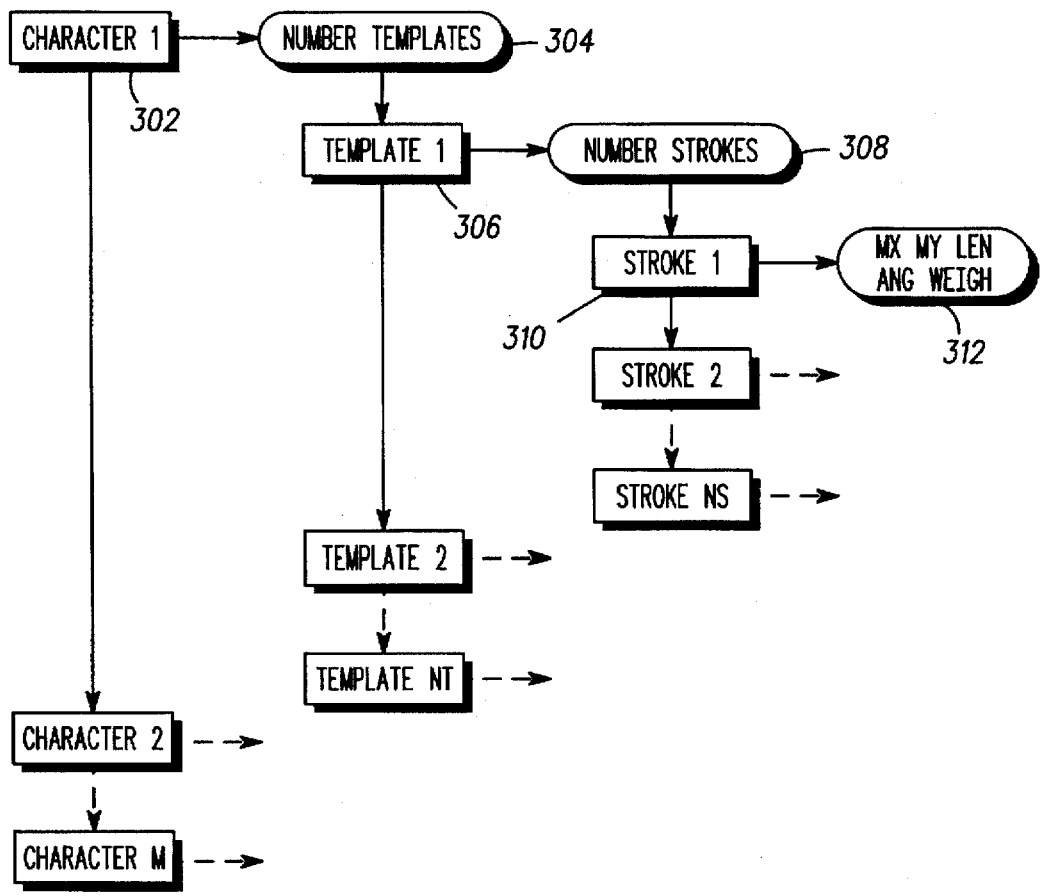
FIG. 3 Illustrates a format of a preferred embodiment of reference templates in accordance with the present invention.

The reference templates are obtained by gathering empirical data and performing statistical analysis. The format for storing the reference templates in the present invention is illustrated in FIG. 3; where the number of characters in the vocabulary is denoted by M. For each character, (example, character 1 marked 302), the number of templates (304) is stored. For each template (306), the number of "strokes" (308) is then stored. For each "stroke" (310), a parametrized description of the stroke and the weight associated with the stroke is stored (312). In 312, the preferred parametrization, i.e. the four dimensional vector [mx, my, len, ang] is shown. However, other parametrizations may also be used. Alternative parameterizations of "stroke" may used in accordance with both the preprocessing module (122) of the present invention and the reference templates (160) of the present invention. However, in a most preferred embodiment of the present invention, the parameterization of the "stroke" are the same for the preprocessing module (122) and for the reference templates (160).

Referring now to FIGS. 1, 2, 4, and 5, FIG. 4 illustrates a block diagram of operation of a preferred embodiment of character matching is shown. In the preferred embodiment illustrated, the character matching module (140) as shown in FIG. 2 includes two distinct components. The components, a fast matching module (600), and a detailed matching module (1000) of the character matching module (140) that resides within recognizer (102) are shown in FIG. 2 and 4. Preferably, the input to the character matching module is the sequence of straight line strokes (125) that is produced by the selected preprocessing module (122). The "strokes" (125) represent the preprocessed handwritten input (20). The first stage, or component, of the character matching module (140) is the fast matching module (600). Generally, the fast matching module (600) component functions to quickly provide a short list (625) of candidate characters that most likely includes a corresponding and representative match to the handwritten input (20) as illustrated in FIG. 5. The second stage or component of the character matching module (140) is the detailed matching module (1000). Generally, the detailed matching module (1000) functions to provide a detailed matching of the handwritten input (20) with only those reference templates (160) of candidate characters provided on the short list (625) produced by the fast matching module (600)0 Preferably, the short list (625) produced from the fast matching module (600) ensures that the detailed matching module can quickly and accurately provide a corresponding representative candidate character to the handwritten input. More preferably, the combination of the fast matching module (600) and the detailed matching module (1000) provide a method and apparatus for recognition of handwritten input that can be done in real time (i.e. the amount of time it takes to write, or input, a character).

Referring to FIG. 5, a block diagram of the fast matching module (600) is shown. Generally, the input to the fast matching module is the above discussed preprocessed handwritten input that is described by a sequence of straight line strokes (125). The output of the fast matching module is a short list of candidate characters (625) that most probably corresponds and represents, or matches, the handwritten input (20).

Figure 6:
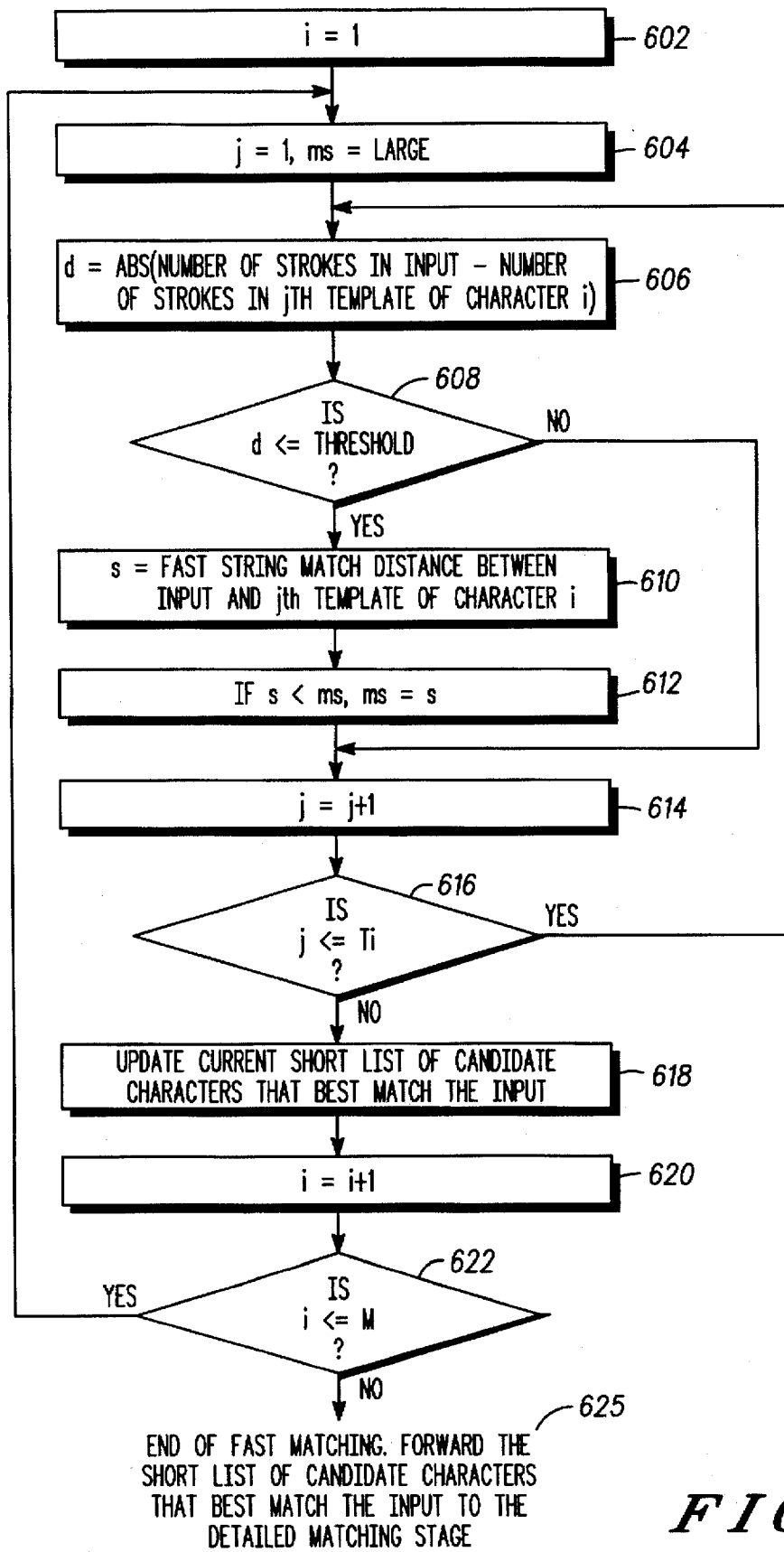
FIG. 6 Illustrates a flow diagram of operation detailing a preferred embodiment of fast matching in accordance with the present invention.

Referring now to FIG. 6, a flow chart detailing the operation of the fast matching module is shown. In FIG. 6, the index i refers to the i th character of the preferred character set, (602) and the index (620) j refers to the j th template of the character. The symbol Ti is the number of templates for the character whose index is i, and the quantity ms is the minimum string matching distance between the input and all the templates of one character. The minimum matching distance is initialized to a large number at the start of each new character (604). Fast matching starts by attempting to match the input with the first template of the first character in the vocabulary (i.e. the character whose index is 1). The absolute difference d between the number of straight line strokes in the input and the number of straight line strokes in the jth template of character i is then computed (606). The difference d is compared against a threshold (608). The threshold can be fixed one or can be variable that depends on the number of strokes in the input and the template. A preferred threshold to use is computed as thresh=(number of strokes in the input + number of strokes in the template)/10 +1. If the difference d is less than the threshold, a fast string matching distance s is computed between the input and the jth template of character i (610). The details of the obtaining of the fast matching distance will be given in the following few paragraphs. The minimum string matching distance ms is updated (612) based on the newly computed fast string matching distance s (610). The steps 606, 608, 610, and 612 are repeated until all the Ti templates for character i are exhausted. Note that if the difference d is greater than the threshold, steps 610 and 612 are omitted and the next template for the character is considered. Once the minimum string matching distance between the input and the templates for character i has been computed, the current shortlist of characters that best match the input is updated (618). In addition to the shortlist of candidate characters that best match the input, the minimum fast string matching distances for matching the input with the templates for each character in the shortlist are also stored. The shortlist is sorted using the minimum fast string matching distances. Given a new character index and a corresponding minimum fast string matching score, the current shortlist is updated by inserting the new character index into the shortlist at the location dictated by the new minimum fast string matching distance. If the new minimum fast string matching distance is greater than the last entry in the current list of minimum fast string matching distances, then the current shortlist does not need to be updated (622). After updating the current short list of candidate characters that best match the input, the next character in the vocabulary, if one such exists, is considered by starting again at step 604. After all the characters in the vocabulary have been considered, the short list of candidate characters that best match the input is forwarded to the detailed matching stage of the character matching module. In FIG. 6, the symbol M is used to denote the vocabulary size (i.e. M=number of characters in the vocabulary).

Figure 8:
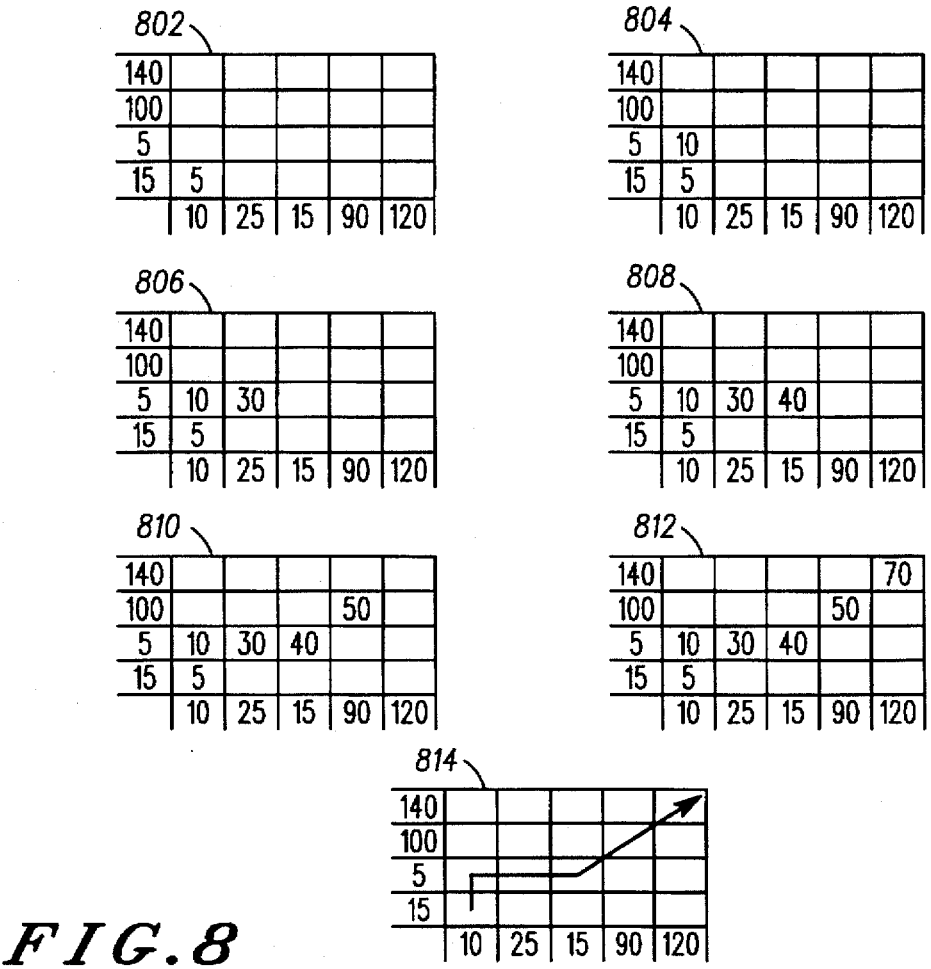
FIG. 8 Illustrates graphically a preferred embodiment of fast matching in accordance with the present invention.

In a preferred method and embodiment of the present invention, the fast string matching in 610 is based on a single stroke feature. However, more than one stroke feature may be used for fast string matching. A preferred stroke feature to use for fast string matching is the angle of the stroke. Hence, the fast string matching distance is the distance between two one dimensional strings. A one dimensional string is simply a string of one dimensional quantities (like a single stroke feature). Note that the lengths of the two strings need not be the same. The technique used to compute the fast string matching distance is illustrated using a simple example. FIGS. 7 and 8 show how the fast string matching distance between the strings S1=[10, 25, 15, 90, 120] and S2=[15, 5, 100, 140] is computed. The length of string S1 is 5 and the length of string S2 is 4. To begin with, the first element of string S1 (702) is paired with the first element of string S2 (704) and the current score is set to the difference between the first element of the two strings. In this case, the current score is −10=5 (see 802 in FIG. 8). At any given time, let the mth element of string S2 be paired with the nth element of string S1. To find the next best matching pair of elements from the two strings, the three immediate neighboring pairs (m+1,n), (m+1,n+1), and (m,n+1) are compared (see 706). The pair that has the least distance is picked as the next matching pair and the distance between the two elements in the new pair is added to the current fast string matching distance. In FIG. 8, the table 802 shows the first elements of the two strings forming a matching pair with a score of 5. To find the next matching pair of elements in the two strings, the three pairs and (5(m+1), 10(n)); (5(m+1), 25(n+1)); and (15(m), 25(n+1)) illustrated in FIGS. 1, 1a, and 12 are considered. Of the three pairs, the pair (5,10) has the least distance of 5. Hence the current pair is moved up and the fast string matching score is updated (5+5=10) (see table 804 in FIG. 8). The processes of finding the best matching pairs in the two strings is repeated until the last element of string S1 is paired with the last element of string S2. These steps are illustrated in tables 806, 808, 810, and 812. The accumulated fast string matching distance when the last elements of the two strings are paired is the final fast string matching distance. In 812, the final string matching distance between the two strings S1 and S2 is 70. Table 814 in FIG. 8 shows the sequence of best matching pairs that was used to compute the fast string matching distance between the two strings S1 and S2.

Figure 9:
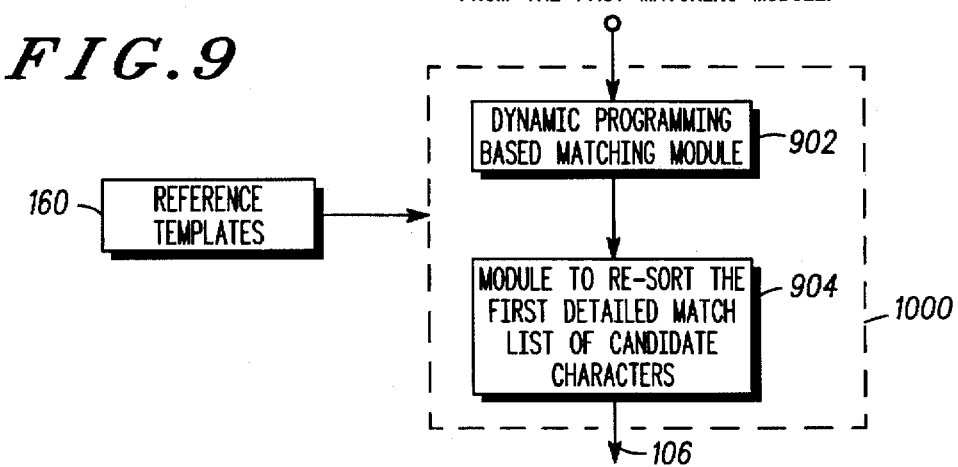
FIG. 9, Illustrates a block diagram for a preferred embodiment of detailed matching in accordance with the present invention.
Figure 10:
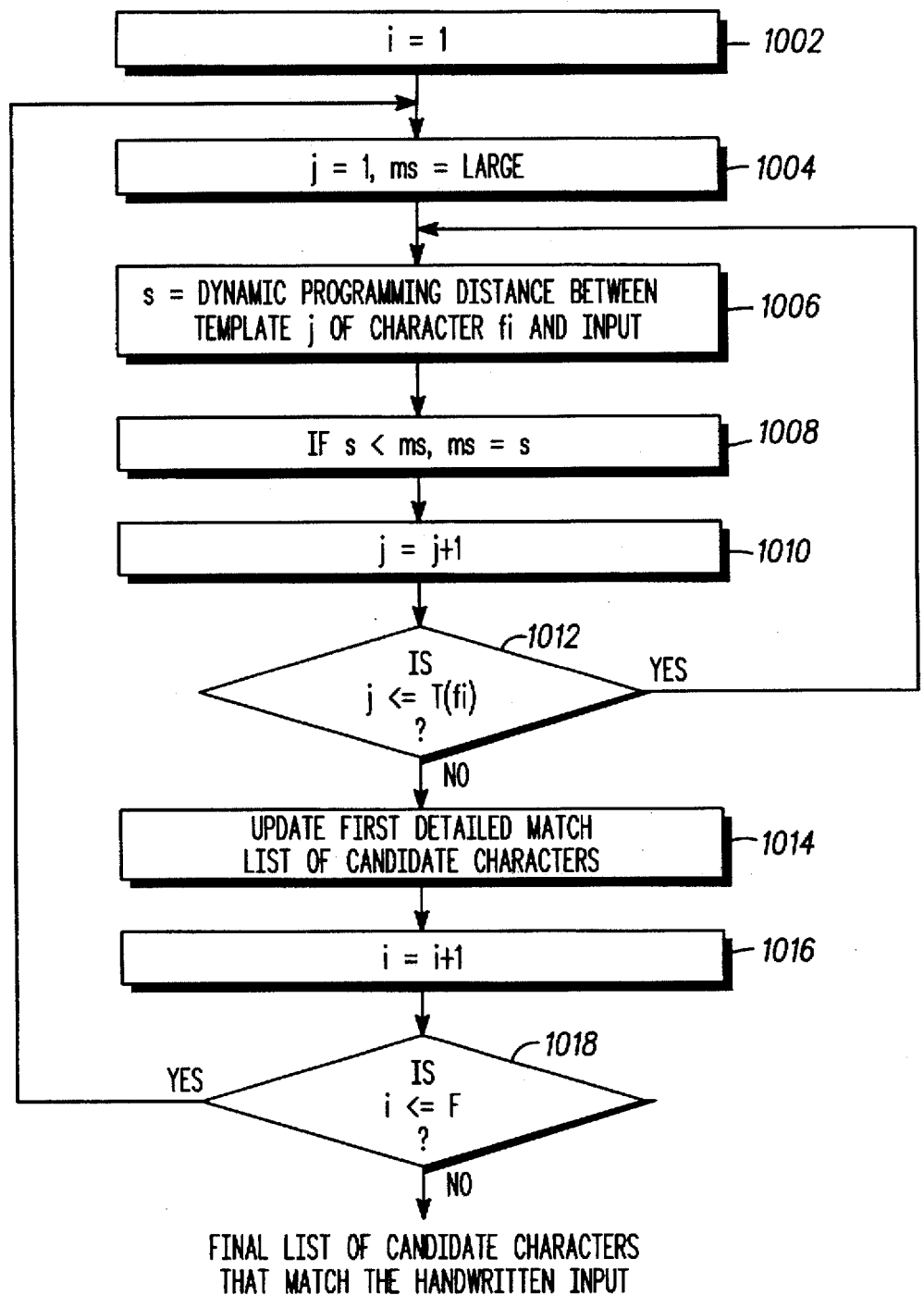
FIG. 10. Illustrates a flow diagram of a preferred embodiment of detailed matching in accordance with the present invention.

FIG. 9 shows the computational blocks of the detailed matching module. The inputs to the detailed matching module are the preprocessed handwritten input (sequence of strokes) and the shortlist of candidate characters that is produced by the fast matching module. The output of the fast detailed matching module (1000) is the final sorted list of candidate characters that best match the input. The detailed matching module comprises of two major computational blocks. The first block (902) finds a detailed matching distance between the input and the templates for all the characters included in the shortlist of candidate characters produced by the fast matching module. The output of 902 is a first detailed match list of candidate characters. The second detailed matching block (904) re-sorts the first detailed match list of candidate characters to produces the final sorted list of candidate characters that best match the handwritten input (106). FIG. 10 is a flow chart describing the dynamic programming based matching module (902). In FIG. 10, the index i refers to the ith entry in the shortlist of candidate characters produced by the fast matching module (1002). The index of the character stored as the i th entry in the fast match short list is denoted by fi. The index j refers to the j th template of character fi and T(fi) is the number of templates stored for character fi. The symbol F is used to denote the size of the fast match short list. The quantity ms is the minimum dynamic programming matching distance between the input and all the templates of one character. The minimum dynamic programming matching distance is initialized to a large number at the start of each new character in the fast match shortlist (1004). Detailed matching starts by attempting to match the input with the first template of the first character in the fast match short list. A matching distance s is computed between the input and the jth template of character fi (see 1006) using the technique of dynamic programming. The technique of dynamic programming is known to one of ordinary skill in the art and can be found in the paper by Sakoe and Chiba. (H. Sakoe and S. Chiba, "Dynamic Programming Algorithm Optimization for Spoken Word Recognition" in Readings in Speech Recognition, A. Waibel and K-F Lee, editors. Morgan Kaufrnann, San Mateo, Calif., USA. 1990.). In the present invention, dynamic programming is used to find a matching distance between two sequences of "strokes". The two sequences of "strokes" represent the prepreprocessed handwritten input and a stored template of a character. In a preferred method and embodiment of the present invention, a stroke is defined to be a straight line parametrized in some fashion. A preferred parametrization of the straight line strokes is by the four dimensional vector [mx, my, ten, ang] where mx is the x coordinate of the mid point of the stroke, my is the y coordinate of the mid point of the stroke, len is the length of the stroke, and ang is the angle made by the straight line stroke with respect to some reference axis. However, other definitions and parametrizations of strokes may be used.

In order to use the dynamic programming technique, the distance between two straight line strokes needs to be defined. A preferred stroke distance to use between two strokes parameterized as [mx1, my1, len1, ang1] and [mx2, my2, len2, ang2] is:

$$\text{stroke distance} = w\_x \; abs(mx1-mx2) + w\_2 \; abs(my1-my2) + w\_l \; abs(len1-len2) + w\_a \; cabs(ang1-ang2).$$

The quantities $w\_x$, $w\_y$, $w\_l$ and $w\_a$ are the weights associated with different dimensions of vector describing a straight line stroke. The function abs(x) is the absolute value of x, and cabs(x) is the absolute value x assuming circular symmetry of x. Note that there is circular symmetry in the stroke angles, since 0 degrees is same as 360 degrees. In the preferred implementation, the quantities mx, my, len, and ang (that describe a straight line stroke) are all quantized to be between 0 and 255, so that a single byte (8 bits) can be used to store them. With the 8-bit quantization of the parameters describing a stroke, the preferred weights to use for computing the stroke distance is $w\_x=1$, $w\_y=1$, $w\_l=1$, and $w\_a=4$.

The minimum dynamic programming matching distance, ms, is updated (1008) based on the newly computed dynamic programming matching distance s (1006). The steps 1006 and 1008 are repeated until all the T(fi) templates for character fi are exhausted (1012). Once the minimum dynamic programming matching distance between the input and the templates for character fi has been computed, the current first detailed match list of characters that best match the input is updated (1014). In addition to the first detailed match list of candidate characters that best match the input, the minimum dynamic programming matching distances for matching the input with the templates for each character in the list are also stored. The first detailed match list is sorted using the minimum dynamic programming matching distances. Given a new character index (1010) and a corresponding minimum dynamic programming matching distance (1012), the current first detailed match list is updated by inserting the new character index into the first detailed match list at the location dictated by the new minimum dynamic programming matching distance (1016). If the new minimum dynamic programming matching distance is greater than the last entry in the current list of minimum dynamic programming matching distances, then the current first detailed match list does not need to be updated (1018). After updating the current first detailed match list of candidate characters that best match the input, the next character in the fast match list, if one such exists, is considered by starting again at step 1004. After all the characters in the fast match list have been considered, the first detailed match list of candidate characters that best match the input is forwarded to the module that resorts the first detailed match list of candidate characters in order to produce the final sorted list of candidate characters that best match the input.

Figure 11:
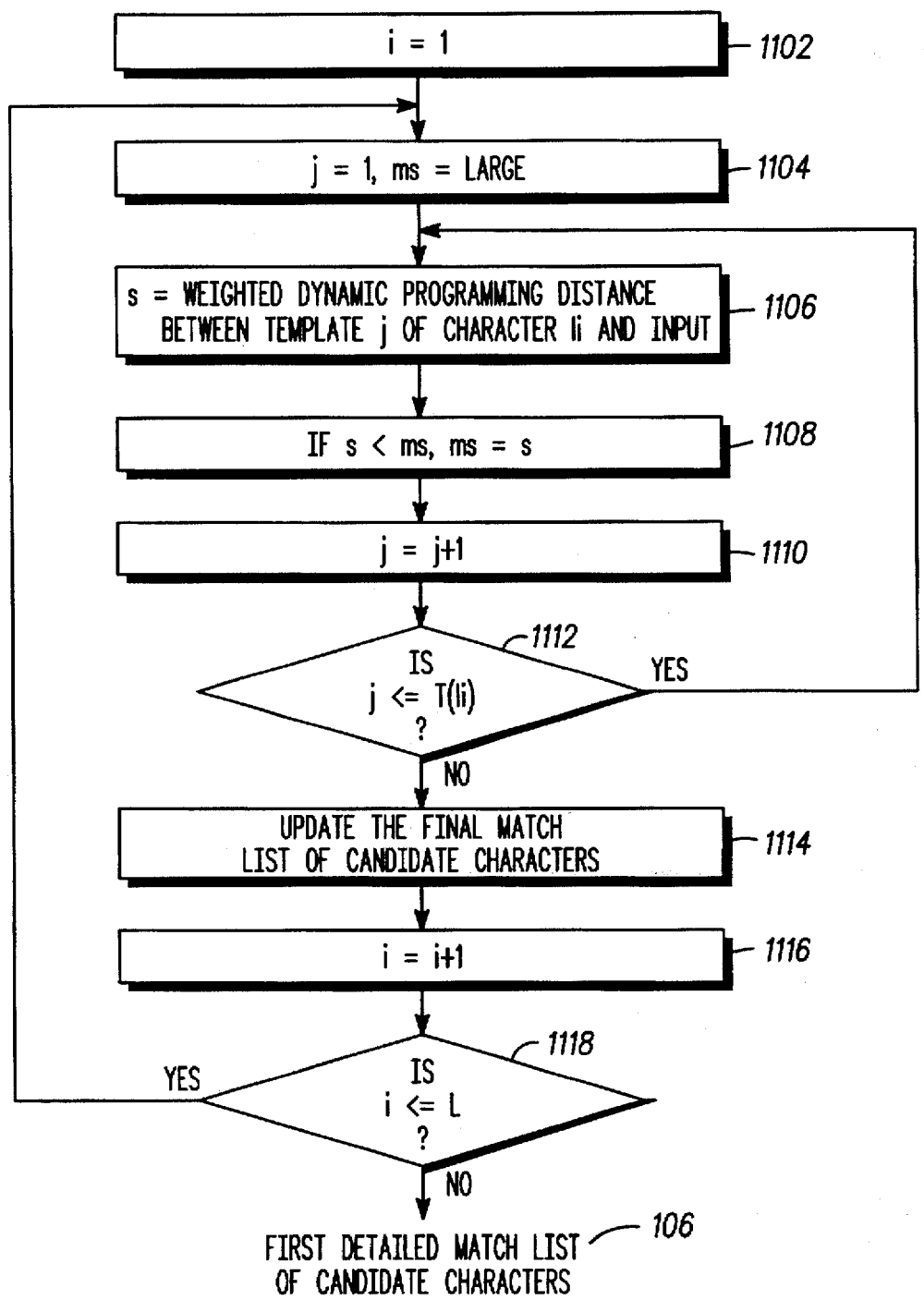
FIG. 11. Illustrates a flow diagram of a preferred embodiment of detailed matching in accordance with the present invention.

FIG. 11 is a flow chart describing the module that re-sorts the first detailed match list of candidate characters. If FIG. 11, the index i refers to the i th entry in the first detailed match list of candidate characters produced by the dynamic programming based matching module (1102). The index of the character stored as the i th entry in the first detailed match list is denoted by li. The index j refers to the j th template of character li and T(li) is the number of templates stored for character li. The symbol L is used to denote the size of the first detailed match list. The quantity ms is the minimum weighted dynamic programming matching distance between the input and all the templates of one character. The minimum weighted dynamic programming matching distance is initialized to a large number at the start of each new character in the first detailed match list (1104). Re-sorting the first detailed match list starts by attempting to compute a minimum weighted dynamic programming matching distance between the input and the first template of the first character in the first detailed match list. A weighted dynamic programming matching distance s is computed between the input and the jth template of character li (see 1106) using the technique of dynamic programming and then weighting individual stroke errors in order to produce the final matching distance. Traditional dynamic programming methods also produce a "best path" which gives the pairing of the input strokes and the strokes in the template. The concept of best path is known to one of ordinary skill in the art. The normal dynamic programming matching distance is simply the sum of the inter-stroke distances along the best path. In order to get the weighted dynamic programming matching distance, a weighted sum of the inter-stroke distance along the best path is used. The weight used for each inter-stroke distance in the best path is weight stored for each template stroke. The rationale for using a weighted dynamic programming matching distance is that some strokes in a handwritten character may be more consistent than other strokes when multiple instance of the same character are considered Hence the more consistent strokes need to be weighted more in order to get robust recognition of handwritten input. The minimum weighted dynamic programming matching distance, ms, is updated (1108) based on the newly computed weighted dynamic programming matching distance s (1106). The steps 1106 and 1108 are repeated until all the T(li) templates for character li are exhausted (1110). Once the minimum weighted dynamic programming matching distance between the input and the templates for character li has been computed (1112), the current sorted list of characters that best match the input is updated (1114). In addition to the sorted match list of candidate characters that best match the input, the minimum weighted dynamic programming matching distances for matching the input with the templates for each character in the list are also stored. The final sorted match list is sorted using the minimum weighted dynamic programming matching distances. Given a new character index and a corresponding minimum weighted dynamic programming matching distance, the current sorted match list is updated by inserting the new character index (1116) into the sorted match list at the location dictated by the new minimum weighted dynamic programming matching distance. If the new minimum weighted dynamic programming matching distance is greater than the last entry in the current list of minimum weighted dynamic programming matching distances, then the current sorted match list does not need to be updated (1118). After updating the current sorted match list of candidate characters that best match the input, the next character in the first detailed match list, if one such exists, is considered by starting again at step 1104. After all the characters in the first detailed match list have been considered, the sorted match list of candidate characters becomes the final sorted list of candidate characters that best match the input Those skilled in the art will find many embodiments of the present invention to be useful. One obvious advantage is ease of data, or text, input over traditional key-board entry methods, including the obvious advantage of the ease of entry of scanned or "off-line" handwritten input into printed data, or text. Another obvious advantage is recognition of handwritten input where the input represents a single character, data point, or other unitary identifying graphically representation, that is a subset of a large complex set of characters, data points, or other graphical representation.

It will be apparent to those skilled in the art that the disclosed invention may be modified in numerous ways and may assume many embodiments other than the preferred forms particularly set out and described above. Accordingly, it is intended by the appended claims to cover all modifications of the present invention that fall within the true spirit and scope of the present invention and its equivalents.

What is claimed is:

1. A method of recognizing a handwritten symbol comprising the steps of:
   (A) receiving a handwritten input as a sequence of (x, y, pen)points where x and y are coordinates in a two dimensional coordinate system and pen is a binary value indicating an associated pen-down state;
   (B) converting the sequence of points into a sequence of strokes, each stroke representing a basic unit used to construct any handwritten symbol in a vocabulary;
   (C) determining a shortlist of candidate symbols in the vocabulary that are likely matches for the input by finding a fast matching distance between the input sequence of strokes and the sequence of strokes for each symbol in the vocabulary, said sequence of strokes for each symbol in the vocabulary being derived from statistical analysis on samples of the handwritten symbols; and
   (D) determining a final sorted list of candidate symbols in the vocabulary that are likely matches for the input by finding a minimum dynamic programming matching distance between the input sequence of strokes and the sequence of strokes for each symbol in the shortlist of candidate symbols in the vocabulary that are likely matches for the handwritten input.

2. The method of claim 1, further comprising the steps of computing a dynamic programming match path and calculating a weighted sum of inter-stroke distances along the dynamic programming match path to find the final sorted list of candidate symbols in the vocabulary that are likely matches for the handwritten input.

3. The method of claim 1, further comprising the step of providing a selectable list of one or more candidate characters having the highest likelihood of corresponding to the handwritten input.

4. The method of claim 3, wherein the number of candidate characters of the selectable list is variable.

5. The method of claim 3, wherein the number of candidate characters of the selectable list is determined by a user.

6. The method of claim 3, wherein the number of candidate characters of the selectable list is ten.

7. The method of claim 3, wherein the handwritten input is displayed and the at least one candidate character is displayed simultaneously.

8. The method of claim 3, wherein the handwritten input is displayed and said selectable list of candidate characters is displayed simultaneously.

9. An apparatus for recognizing a handwritten symbol comprising;
   (A) a digitizing tablet for receiving handwritten input, said handwritten input having a sequence of (x, y, pen) points where x and y coordinates are in a two dimensional coordinate system and pen is a binary value indicating an associated pen-up/pen-down state;
   (B) a memory for storing an input sequence of strokes, said sequence of strokes representing the sequence of points, each stroke representing a basic unit used to construct at least one handwritten symbol of a character set;
   (C) a processor for generating a shortlist of candidate symbols the character set that most likely represent the input by finding a fast matching distance between the input sequence of strokes and a sequence of strokes representing each symbol in a vocabulary, said sequence of strokes representing each symbol in the vocabulary being derived from statistical analysis of a plurality of samples of handwritten symbols; and
   (D) a processor for generating a final sorted list of candidate symbols of the vocabulary which most likely represents the handwritten input by finding a detailed matching distance between the input sequence of strokes and the sequence of strokes for each symbol in the said shortlist of candidate symbols in the vocabulary that most likely represents the handwritten input.

10. The apparatus of claim 9, further comprising a display having a selectable list of one or more candidate characters having the highest likelihood of corresponding to the handwritten input.

11. The apparatus of claim 10, wherein the number of candidate characters of the selectable list is variable.

12. The apparatus of claim 10, wherein the number of candidate characters of the selectable list is determined by a user.

13. The apparatus of claim 10, wherein the number of candidate characters of the selectable list is ten.

14. The apparatus of claim 10, wherein the handwritten input is displayed and the selectable list is displayed simultaneously.

15. The apparatus of claim 10, wherein the handwritten input is displayed and said selectable list of candidate characters is displayed simultaneously.

16. A method of recognizing handwritten input comprising the steps of:
   receiving handwritten input;
   preprocessing the handwritten input to represent a string of strokes;
   analyzing the handwritten input by matching of the string of strokes and a sequence of strokes for a plurality of symbols in a vocabulary to provide a shortlist of candidate characters which most likely correspond to the handwritten input;
   accessing a plurality of reference templates corresponding to only the candidate characters of the shortlist and comparing the handwritten input with at least one of said reference templates to identify at least one candidate character most likely to represent said handwritten input.

17. A method of recognizing handwritten input comprising the steps of:
   analyzing handwritten input to provide a plurality of candidate characters that most likely represent the handwritten input by finding a fast matching distance between an input sequence of strokes and a sequence of strokes for each symbol in a vocabulary of characters;

accessing a plurality of reference templates corresponding to the candidate characters and comparing the handwritten input with at least one of said reference templates to identify at least one of the candidate characters that most likely represents said handwritten input by finding a detailed matching distance between the input sequence of strokes and a sequence of strokes for each one of said reference templates;

providing a selectable list of a plurality of candidate characters, said list having candidate characters having the highest likelihood of corresponding to the handwritten input.

18. The method of claim 17, wherein the handwritten input has been preprocessed to represent a string of strokes.

19. The method of claim 17, wherein the number of candidate characters of the selectable list is variable.

20. The method of claim 17, wherein the number of candidate characters of the selectable list is determined by a user.

21. The method of claim 17, wherein the number of candidate characters of the selectable list is ten.

22. The method of claim 17, wherein the handwritten input is displayed juxtaposed at least one candidate character.

23. The method of claim 17, wherein the handwritten input is displayed in close juxtaposed said selectable list of candidate characters.

24. A method of recognizing handwritten input comprising the steps of:

analyzing a preprocessed sequence of strokes representing handwritten input to provide a short list of a plurality of candidate characters having a likelihood of corresponding to said preprocessed handwritten input;

analyzing said handwritten input and said short list of said plurality of candidate characters by comparison of each of said sequence of strokes of the handwritten input with at least one reference template having a sequence of strokes corresponding to each of said plurality of candidate characters in said short list;

providing a selectable list of at least one candidate character, said list of candidate characters having the highest likelihood of corresponding to the handwritten input.

25. A method of recognizing handwritten input comprising the steps of:

receiving preprocessed handwritten input as a sequence of strokes;

providing a shortlist of at least one of a plurality of candidate characters, by comparison of said handwritten input with a plurality of reference templates, each of said templates having a sequence of strokes representing a corresponding candidate character;

providing, by selection from said shortlist, a selectable list of at least one of a plurality of candidate characters, said list of candidate characters having the highest likelihood of corresponding to the handwritten input.

26. An apparatus for recognizing handwritten input comprising;

a memory for storing preprocessed handwritten input as a sequence of strokes;

a processor generating a shortlist of candidate characters, said shortlist generated by fast matching of said preprocessed handwritten input with a plurality of reference templates, each of said templates having a sequence of strokes representing a corresponding candidate character;

a processor generating a selectable list of at least one of a plurality of candidate characters, by detailed matching of said preprocessed handwritten input with reference templates for said shortlist of candidate characters, whereby said selectable list of candidate characters has the highest likelihood of corresponding to the handwritten input.

27. A method of recognizing a handwritten symbol comprising the steps of:

receiving a handwritten input as a sequence of (x, y, pen)points where x and y are coordinates in a two dimensional coordinate system and pen is a binary value indicating an associated pen-down state;

converting the sequence of points into a sequence of strokes, each stroke representing a basic unit used to construct any handwritten symbol in a vocabulary;

parametizing each stroke using a four dimensional vector having an x coordinate of the midpoint of the stroke, a y coordinate of the midpoint of the stroke, a length representing the length of the stroke, and an angle representing the angle of the stroke with respect to a reference axis.

determining a shortlist of candidate symbols in the vocabulary that are likely matches for the input by finding a fast matching distance between the input sequence of strokes and the sequence of strokes for each symbol in the vocabulary, said sequence of strokes for each symbol in the vocabulary being derived from statistical analysis on samples of the handwritten symbols; and determining a final sorted list of candidate symbols in the vocabulary that are likely matches for the input by finding a detailed matching distance between the input sequence of strokes and the sequence of strokes for each symbol in the shortlist of candidate symbols in the vocabulary that are likely matches for the handwritten input.

28. A method of recognizing a handwritten symbol comprising the steps of:

providing a vocabulary of handwritten symbols, each symbol represented as a sequence of strokes, each stroke representing a basic unit used to construct any handwritten symbol in the vocabulary, said sequence of strokes for each symbol in the vocabulary being derived from statistical analysis on samples of the handwritten symbols;

receiving a handwritten input as a sequence of (x, y, pen) points where x and y are coordinates in a two dimensional coordinate system and pen is a binary value indicating an associated pen-down state;

converting the sequence of points into a sequence of strokes;

parametizing each stroke using a vector having an x coordinate of the midpoint of the stroke, a y coordinate of the midpoint of the stroke, a length representing the length of the stroke, and an angle representing the angle of the stroke with respect to a reference axis;

associating different weighting values to different strokes, said weighting values being derived from statistical analysis on a plurality of handwritten symbols;

determining a list of candidate symbols in the vocabulary that are likely matches for the input by finding a matching distance between the input sequence of strokes and the sequence of strokes for each symbol in the vocabulary, taking account of the weighting values.

29. The method of claim 28, further comprising calculating a stroke distance between two or more straight line strokes such that the stroke distance is equivalent to $$w\_x\ abs(mx1-mx2)+w\_2\ abs(my1-my2)+w\_1\ abs(len1-len2)+w\_a\ cabs(ang1-ang2).$$

where tax1 and mx2 are the x coordinates of the mid-point of two strokes, my1 and my2 are the y coordinates of the midpoint of the two strokes, len1 and len2 are the lengths of the two strokes, ang1 and ang2 are the angles of the two strokes with respect to a common reference, and $w\_x$, $w\_y$, $w\_1$ and $w\_a$ are weighting values.

30. A method, comprising the steps of:
  receiving handwritten input as data representing a sequence of strokes;
  determining a shortlist of a plurality of candidate symbols from stored templates that are likely matches for the handwritten input by comparing one or more stroke parameters between the sequence of strokes representing the handwritten input and the sequence of strokes for a plurality of symbols from the templates; and
  determining one or more recognized symbols that are likely matches for the handwritten input by comparing two or more stroke parameters between the sequence of strokes representing the handwritten input and the sequence of strokes for each symbol in the shortlist that are likely matches for the handwritten input.

31. A method, comprising the steps of:
  processing handwritten input as a sequence of handwritten strokes to provide data representing a sequence of straight strokes;
  determining a shortlist of a plurality of candidate symbols from stored templates that are likely matches for the handwritten input by comparing one or more stroke parameters between the sequence of straight strokes representing the handwritten input and the sequence of strokes for a plurality of symbols from the templates; and
  determining one or more recognized symbols that are likely matches for the handwritten input by comparing two or more stroke parameters between the sequence of straight strokes representing the handwritten input and the sequence of strokes for each symbol in the shortlist that are likely matches for the handwritten input.

32. A method, comprising the steps of:
  receiving handwritten input as data representing a sequence of strokes;
  determining an angle parameter for each of the sequence of strokes, the angle parameter representing an angle of the stroke from a reference axis;
  determining a shortlist of a plurality of candidate symbols from stored templates that are likely matches for the handwritten input by comparing the angle parameter between the sequence of strokes representing the handwritten input and the sequence of strokes for a plurality of symbols from the templates; and
  determining one or more recognized symbols that are likely matches for the handwritten input by comparing other stroke parameters between the sequence of strokes representing the handwritten input and the sequence of strokes for each symbol in the shortlist that are likely matches for the handwritten input.

33. A method, comprising the steps of:
  receiving handwritten input as data representing a sequence of strokes;
  determining stroke parameters for each of the sequence of strokes, the stroke parameters selected from the group of parameters consisting of:
    an angle parameter representing an angle of the stroke from a reference axis;
    a x coordinate midpoint parameter representing the x coordinate of the midpoint of the stroke;
    a y coordinate midpoint parameter representing the y coordinate of the midpoint of the stroke;
    a length parameter representing stroke length;
  determining a plurality of candidate symbols from stored templates that are likely matches for the handwritten input by comparing one stroke parameter between the sequence of strokes representing the handwritten input and the sequence of strokes for a plurality of symbols from the templates; and
  determining one or more recognized symbols that are likely matches for the handwritten input by comparing two or more stroke parameters between the sequence of strokes representing the handwritten input and the sequence of strokes for each symbol in the plurality of candidate symbols that are likely matches for the handwritten input.

34. An apparatus, comprising
  a digitizing tablet for receiving handwritten input as a sequence of strokes;
  a memory having data and instructions stored therein and having a plurality of templates representing characters or symbols some of which may correspond to the handwritten input;
  a processor for processing the data or instructions in the memory to provide a shortlist of a plurality of candidate symbols by comparing at least one stroke parameter between the sequence of strokes representing the handwritten input and a sequence of strokes for one or more characters or symbols in the memory, and for providing a selectable plurality of recognized symbols by comparing two or more stroke parameters between the sequence of strokes representing the handwritten input and the sequence of strokes for each of the plurality of candidate symbols of the shortlist.

35. A method of recognizing a handwritten symbol comprising the steps of:
  (A) receiving a handwritten input as a sequence of (x, y) points where x and y are coordinates in a two dimensional coordinate system;
  (B) converting the sequence of points into a sequence of strokes, each stroke representing a basic unit used to construct any handwritten symbol in a vocabulary;
  (C) determining a shortlist of candidate symbols in the vocabulary that are likely matches for the input by finding a fast matching distance between the input sequence of strokes and the sequence of strokes for each symbol in the vocabulary, said sequence of strokes for each symbol in the vocabulary being derived from statistical analysis on samples of the handwritten symbols, said step of determining a shortlist including comparing a difference between a number of strokes in an input sequence of strokes and a number of strokes in a template with a threshold; and
  (D) determining a final sorted list of candidate symbols in the vocabulary that are likely matches for the input by finding a minimum dynamic programming matching distance between the input sequence of strokes and the sequence of strokes for each symbol in the shortlist of candidate symbols in the vocabulary that are likely matches for the handwritten input.

36. A method of recognizing a handwritten symbol comprising the steps of:

(A) receiving a handwritten input as a sequence of (x, y) points where x and y are coordinates in a two dimensional coordinate system;

(B) converting the sequence of points into a sequence of strokes, each stroke representing a basic unit used to construct any handwritten symbol in a vocabulary;

(C) determining a shortlist of candidate symbols in the vocabulary that are likely matches for the input by finding a fast matching distance between first and second sets of strokes, where one of the first and second sets of strokes is the input sequence of strokes and the other is the sequence of strokes for each symbol in the vocabulary, said sequence of strokes for each symbol in the vocabulary being derived from statistical analysis on samples of the handwritten symbols, said step of finding a fast matching distance including calculating distances between a stroke in one of the sets of strokes and neighboring strokes in the other of the sets of strokes; and (D) determining a final sorted list of candidate symbols in the vocabulary that are likely matches for the input by finding a minimum dynamic programming matching distance between the input sequence of strokes and the sequence of strokes for each symbol in the shortlist of candidate symbols in the vocabulary that are likely matches for the handwritten input.

* * * * *